(12) United States Patent
Otake et al.

(10) Patent No.: US 10,886,859 B2
(45) Date of Patent: Jan. 5, 2021

(54) ALTERNATING-CURRENT POWER SUPPLY DEVICE WITH WINDINGS WOUND IN DIFFERENT DIRECTIONS

(71) Applicant: ROHM CO., LTD., Kyoto (JP)

(72) Inventors: Hirotaka Otake, Kyoto (JP); Yusuke Nakakohara, Kyoto (JP); Mamoru Tsuruya, Saitama (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 16/092,144

(22) PCT Filed: Apr. 11, 2017

(86) PCT No.: PCT/JP2017/014838
§ 371 (c)(1),
(2) Date: Oct. 8, 2018

(87) PCT Pub. No.: WO2017/179578
PCT Pub. Date: Oct. 19, 2017

(65) Prior Publication Data
US 2019/0115851 A1    Apr. 18, 2019

(30) Foreign Application Priority Data

Apr. 13, 2016  (JP) ................................. 2016-080073

(51) Int. Cl.
H02M 7/53      (2006.01)
H02M 7/5387    (2007.01)
(Continued)

(52) U.S. Cl.
CPC .......... *H02M 7/5387* (2013.01); *H01F 27/24* (2013.01); *H02M 7/48* (2013.01); *H02M 7/5395* (2013.01)

(58) Field of Classification Search
CPC .... H02M 7/5387; H02M 7/5395; H01F 27/24
See application file for complete search history.

(56) References Cited

U.S. PATENT DOCUMENTS 2,771,587 A      11/1956  Henderson
2002/0093409 A1   7/2002  Fujiwara et al.
(Continued)

FOREIGN PATENT DOCUMENTS

CN       1473337 A    2/2004
CN       2641781 Y    9/2004
(Continued)

OTHER PUBLICATIONS

Tektronix, "Fundamentals of Power Measurement—Key Points in Voltage, Current, and Power Management", Dec. 3, 2013, 20 pages with an English Translation.
(Continued)

*Primary Examiner* — Shawki S Ismail
*Assistant Examiner* — Demetries A Gibson
(74) *Attorney, Agent, or Firm* — Hamre, Schumann, Mueller & Larson, PC.

(57) ABSTRACT

The alternating-current power supply device 1 has: an alternating-current generation bridge 10 for obtaining an alternating-current output; PWM control bridges 20, 30, each including two switch components; and a coupling reactor 40 connected to the PWM control bridges 20, 30. The coupling reactor 40 includes: a core 43; and windings 41, 42 which are connected at one end to respective output ends of the PWM control bridges 20, 30 while being coupled with each other via the core 43. The windings 41, 42 are respectively wound in such directions that magnetic fluxes generated in the core 43 cancel each other out.

12 Claims, 9 Drawing Sheets

(51) Int. Cl.
*H02M 7/48* (2007.01)
*H01F 27/24* (2006.01)
*H02M 7/5395* (2006.01)

(56) References Cited

U.S. PATENT DOCUMENTS

| | | |
|---|---|---|
| 2002/0097126 A1 | 7/2002 | Fujiwara et al. |
| 2002/0097127 A1 | 7/2002 | Fujiwara et al. |
| 2002/0109571 A1 | 8/2002 | Fujiwara et al. |
| 2002/0149458 A1 | 10/2002 | Fujiwara et al. |
| 2004/0136209 A1* | 7/2004 | Hosokawa ........ H02M 3/33592 363/24 |
| 2004/0207500 A1 | 10/2004 | Fujiwara et al. |
| 2005/0116804 A1 | 6/2005 | Fujiwara et al. |
| 2012/0319699 A1* | 12/2012 | Watanabe ............ G01R 31/025 324/551 |
| 2014/0049998 A1* | 2/2014 | Casey ................... H02M 7/48 363/97 |
| 2014/0328102 A1* | 11/2014 | Wang ................. H02M 7/5387 363/132 |
| 2015/0138859 A1* | 5/2015 | Zhou ..................... H02M 7/493 363/132 |
| 2015/0213942 A1* | 7/2015 | Kuroda ................... H01F 3/10 336/178 |
| 2015/0213944 A1* | 7/2015 | Kuroda ................... H01F 3/10 336/212 |
| 2015/0333667 A1* | 11/2015 | Fujita ..................... H02P 6/002 318/400.2 |
| 2016/0241043 A1* | 8/2016 | Sugimoto ........... H02M 7/5387 |
| 2017/0058152 A1* | 3/2017 | Hardin ....................... C09J 9/02 |
| 2017/0076850 A1 | 3/2017 | Liu et al. |
| 2018/0350513 A1* | 12/2018 | Murakami .............. H01F 37/00 |

FOREIGN PATENT DOCUMENTS

| | | |
|---|---|---|
| CN | 101944839 A | 1/2011 |
| CN | 104021920 | 9/2014 |
| CN | 204884803 U | 12/2015 |
| DE | 1 538 250 | 7/1969 |
| DE | 10 2012 107 122 | 2/2013 |
| JP | 5-101943 | 4/1993 |
| JP | 7-086784 B | 9/1995 |
| JP | 2003-088130 | 3/2003 |
| JP | 2011-223789 | 11/2011 |
| JP | 2014-078577 | 5/2014 |

OTHER PUBLICATIONS

International Search Report issued in International Application No. PCT/JP2017/014838, dated Jun. 20, 2017, 3 pages.
Official Action, Chinese Patent Application No. 2019112701690560, dated Dec. 2, 2019 (9 pages).
English translation of an Office Action issued in corresponding German Patent Application No. 11 2017 001 372.0, dated Feb. 20, 2020, 6 pages.
Office Action issued in corresponding Chinese Application No. 201780023486.2, dated May 15, 2020, 13 pages with translation.

* cited by examiner

ALTERNATING-CURRENT POWER SUPPLY DEVICE WITH WINDINGS WOUND IN DIFFERENT DIRECTIONS

TECHNICAL FIELD

The present invention relates to alternating-current power supply devices.

BACKGROUND ART

Nowadays, switching power supply devices having a switching device and a filter, such as DC-DC converters and DC-AC converters, find application in a very wide range of fields such as consumer and industrial equipment. In these switching power supply devices, compactness, lightness, and high efficiency are valued, and the higher the power they are designed for, the stronger the demand for such qualities.

Among others, for example, DC-AC converters used in UPSs (uninterruptible power supplies) and power conditioners, even when operating at the same output current in terms of effective (RMS) value basis as DC-DC converters do, as mentioned in the description of a conventional technology in Patent Document 1 and in non-Patent Document 1, tend to be subject to an excessive current flowing therethrough instantaneously. Thus, common DC-AC converters can have a crest factor (a wave height ratio: the ratio of the peak current value to the effective current value) of two to three or higher, and thus requires a filter circuit that can handle a very high peak current. Thus, as compared with DC-DC converters, DC-AC converters are subject to stricter conditions in terms of the material properties or electrical characteristics of a choke coil and a capacitor.

On the other hand, by driving a switching device in a DC-AC converter having a filter circuit at a higher frequency than ever, it is possible to reduce the inductance value of a choke coil, and the capacitance value of a capacitor, forming the filter circuit; even then it is possible to produce the same output ripple current and voltage as before. This contributes to reducing the size and weight of the entire power supply device.

LIST OF CITATIONS

Patent Literature

Patent Document 1: Japanese Examined Patent Application No. H7-86784

Non-Patent Literature

Non-Patent Document 1: Tektronix, Inc. *Fundamentals of power measurement—voltage, current, point of power measurement* (in particular, 2.5 crest factor) [online], February 2011 [retrieved on 2013 Dec. 3]. Retrieved from <URL: jp.tek.com/dl/55Z_29828_0_3.pdf>

SUMMARY OF THE INVENTION

Technical Problem

However, reducing the size of the power supply device by driving the switching device at a higher frequency also have negative sides such as increased switching loss, increased power consumption in a gate drive circuit, and increased core loss in the choke coil. It is therefore inadvisable to change the design without careful consideration, and in DC-AC converters having a high crest factor in particular, a filter circuit inconveniently needs to be made larger to suppress magnetic saturation.

To cope with the above-mentioned problems encountered by the present inventors, the present invention is aimed at providing a compact high-efficiency alternating-current power supply device less prone to malfunction.

Means for Solving the Problem

According to one aspect of what is disclosed herein, an alternating-current power supply device includes: an AC generation bridge for producing an AC output; first and second PWM control bridges each including two switching devices; and a coupling reactor connected to the first and second PWM control bridges. The coupling reactor includes: a core; and first and second windings one end of each of which is connected to respective output terminals of the first and second PWM control bridges, the first and second windings being coupled together via the core. The first and second windings are wound in such directions that magnetic fluxes which they generate inside the core cancel each other (a first configuration).

In the alternating-current power supply device according to the first configuration, preferably, in the first and second PWM control bridges, the switching devices are turned ON and OFF with a phase difference of a half cycle from each other (a second configuration).

In the alternating-current power supply device according to the first or second configuration, preferably, the core is composed of at least a first core and a second core in combination, the first core being a member separate from the second core. Preferably, the first and second windings are wound around the first core in such directions that magnetic fluxes which they generate inside the first core cancel each other, and neither of the first winding nor the second winding is wound around the second core. Preferably, the second core is arranged such that the magnetic fluxes passing through the second core generate a leakage inductance in the coupling reactor (a third configuration).

In the alternating-current power supply device according to the third configuration, preferably, the variation frequency of a magnetic flux generated in the second core is higher than the driving frequency of the switching devices (a fourth configuration).

In the alternating-current power supply device according to the third or fourth configuration, preferably, the first core is formed of a material having isotropic insulation resistance (a fifth configuration).

In the alternating-current power supply device according to any one of the third to fifth configurations, preferably, the first core is formed of a material having anisotropic insulation resistance. Preferably, the second core is arranged to cover at least a part of a side surface of the first core (a sixth configuration)

In the alternating-current power supply device according to the sixth configuration, preferably, the core further includes a magnetic shielding member for restricting the path of a magnetic flux passing between the first core and the second core to the sideways direction with respect to the first core (a seventh configuration).

In the alternating-current power supply device according to the sixth or seven configuration, preferably, the cross-sectional area of the second core in a part thereof excluding a part thereof coupled with the first core is larger than the cross-sectional area of the part of the second core coupled with the first core (an eighth configuration).

In the alternating-current power supply device according to any one of the third to eighth configurations, preferably, the density of a saturated magnetic flux in the second core is equal to or higher than the density of a saturated magnetic flux in the first core (a ninth configuration).

According to another aspect of what is disclosed herein, an alternating-current power supply device includes: an AC generation bridge for producing an AC output; first and second PWM control bridges each including two switching devices; and a coupling reactor connected to the first and second PWM control bridges. The coupling reactor includes: a core; and first and second windings one end of each of which is connected to respective output terminals of the first and second PWM control bridges, the first and second windings being coupled together via the core. The core is composed of at least a first core and a second core in combination. The first and second cores are both made of the same material having anisotropic insulation resistance, and are formed such that the insulation resistance does not vary along the direction of a magnetic flux passing through the first and second cores. The first and second windings are wound around the first core in such directions that magnetic fluxes which they generate inside the first core cancel each other, and neither of the first winding nor the second winding is wound around the second core. The second core is arranged such that the magnetic fluxes passing through the second core generate a leakage inductance in the coupling reactor (a tenth configuration).

In the alternating-current power supply device according to any one of the first to tenth configurations, preferably, the driving frequency of the switching devices varies according to an output current (an eleventh configuration).

In the alternating-current power supply device according to any one of the first to eleventh configurations, preferably, at least one of the switching devices comprises a SiC semiconductor or a GaN semiconductor (a twelfth configuration).

Advantageous Effects of the Invention

According to the present invention disclosed herein, it is possible to provide a compact high-efficiency alternating-current power supply device less prone to malfunction.

DESCRIPTION OF EMBODIMENTS

Alternating-Current Power Supply Device (Overall Configuration)

Figure 1:
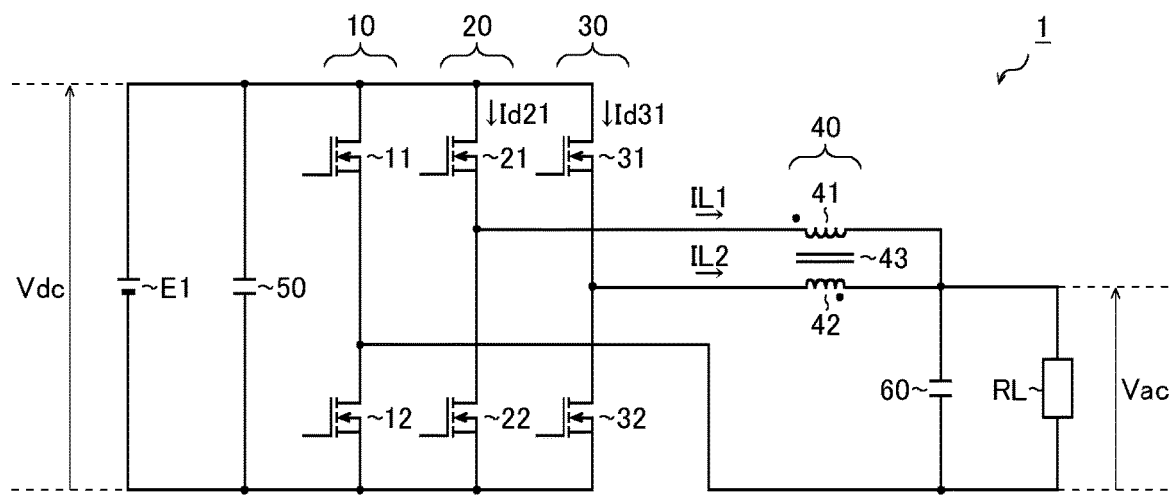
FIG. 1 is a circuit diagram showing an overall configuration of an alternating-current power supply device.

FIG. 1 is a circuit diagram showing an overall configuration of an alternating-current power supply device. The alternating-current power supply device 1 according to the configuration example is a DC-AC converter (inverter) that converts a DC voltage Vdc (for example, DC 320 V), which is supplied from a DC power source E1, to a desired AC voltage Vac (for example, AC 200 V) to feed it to a load RL. The alternating-current power supply device 1 includes an AC generation bridge 10, PWM (pulse width modulation) control bridges 20 and 30, a coupling reactor 40, an input capacitor 50, and an output capacitor 60.

The AC generation bridge 10 includes switching devices 11 and 12 (in the illustrated example, N-channel MISFETs (metal-insulator-semiconductor field-effect transistors)) connected in series between a positive terminal and a negative terminal of the DC power source E1, and turns the switching devices 11 and 12 ON and OFF in a complementary manner at a predetermined AC frequency (for example, 60 Hz) to produce an AC output.

The PWM control bridges 20 and 30 include switching devices 21 and 22 and switching devices 31 and 32 (in the illustrated example, all are N-channel MISFETs) respectively, which are connected in series between the positive terminal and the negative terminal of the DC power source E1. The PWM control bridges 20 and 30 turn the switching devices ON and OFF in a complementary manner with a predetermined phase difference from each other (for example, a phase difference of a half cycle) to perform interleave operation. The ON-duty (the proportion of the ON-period in one cycle) of the switching devices is subjected to appropriate PWM control so that a desired AC waveform is generated.

The coupling reactor 40 is connected between respective output terminals of the PWM control bridges 20 and 30 and the load RL. The coupling reactor 40 includes a first winding 41, a second winding 42, and a core 43. A first terminal of the first winding 41 is connected to the output terminal of the PWM control bridge 20 (the connection node between the switching devices 21 and 22). A first terminal of the second winding 42 is connected to the output terminal of the PWM control bridge 30 (the connection node between the switching devices 31 and 32). A second terminal of the first winding 41 and a second terminal of the second winding 42 are both connected to a first terminal of the load RL. The first winding 41 and the second winding 42 are magnetically coupled together via the core 43.

The input capacitor 50 is connected in series between the positive terminal and negative terminal of the DC power source E1, and smooths the DC voltage Vdc.

A first terminal of the output capacitor 60 is connected to the first terminal of the load RL. A second terminal of the output capacitor 60 is connected to a second terminal of the load RL and an output terminal of the AC generation bridge 10 (the connection node between the switching devices 11 and 12). So connected, the output capacitor 60, along with the leakage inductance (of which the details will be described later) of the coupling reactor 40, forms an LC filter, and smooths the AC voltage Vac.

Figure 2:
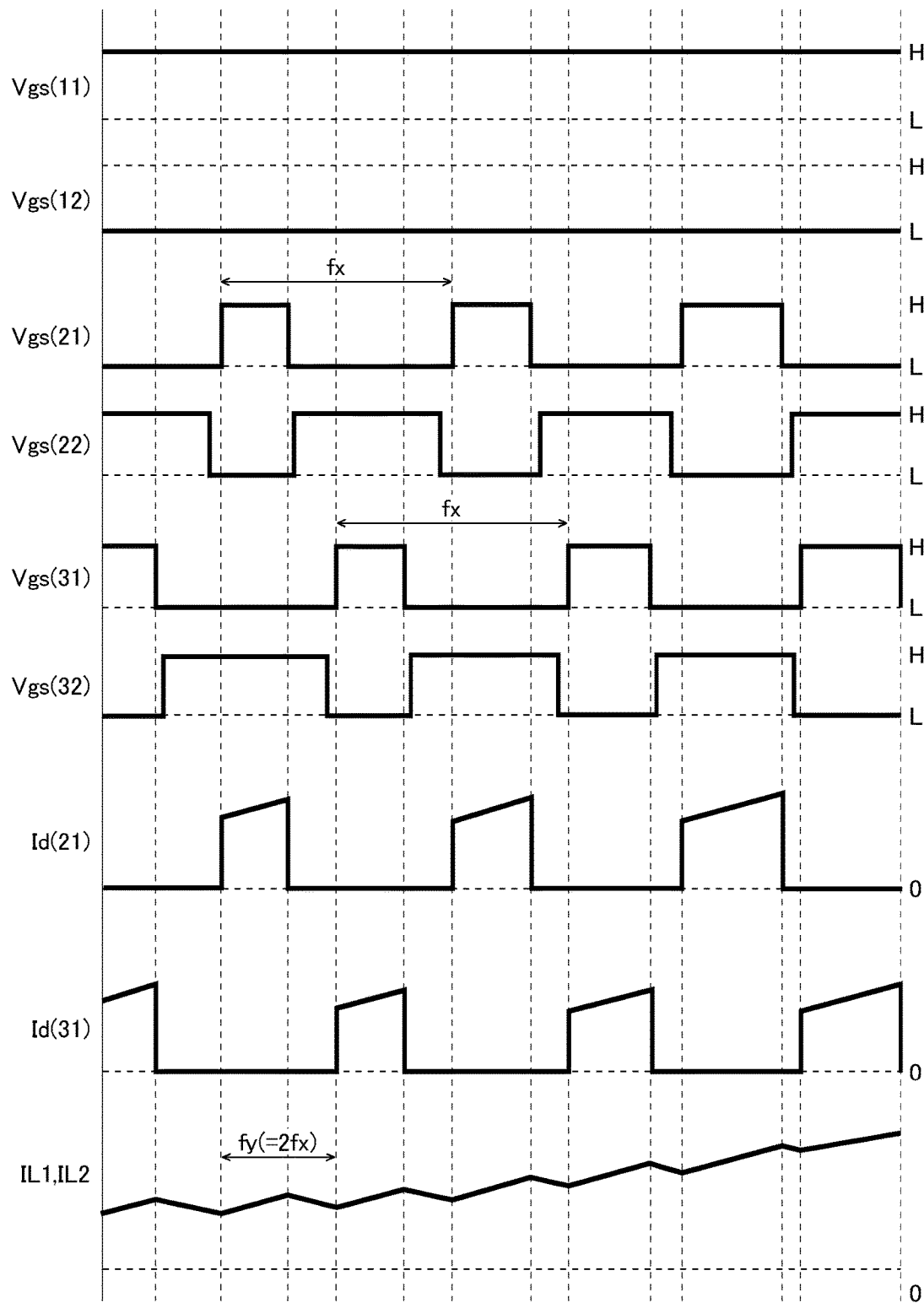
FIG. 2 is a timing chart illustrating the basic operation of an alternating-current power supply device.

FIG. 2 is a timing chart illustrating the basic operation of the alternating-current power supply device 1, depicting, from top down, the gate-source voltages Vgs (11) and Vgs (12) of the switching devices 11 and 12 respectively, the gate-source voltages Vgs (21) and Vgs (22) of the switching devices 21 and 22 respectively, the gate-source voltages Vgs (31) and Vgs (32) of the switching devices 31 and 32 respectively, the drain current Id (21) of the switching device 21, the drain current Id (31) of the switching device 31, and the inductor currents IL1 and IL2 in respective phases. FIG. 2 shows an example of the behavior of outputs as observed when the switching device 11 is ON and the switching device 12 is OFF.

As shown there, the switching devices 21 and 22 and the switching devices 31 and 32 are turned ON and OFF in a complementary manner at a predetermined driving frequency fx (for example, fx=20 kHz) in respective phases. The driving phase of the switching devices 21 and 22 and the driving phase of the switching devices 31 and 32 have a phase difference of a half cycle.

Here, the first winding 41 and the second winding 42 of the coupling reactor 40 are magnetically coupled together; thus, as a current flows through one of them, a current flows also through the other one in the same direction. As a result, the inductor currents IL1 and IL2 that flow through the first winding 41 and the second winding 42 show similar behavior. That is, inductor currents IL1 and IL2 modulated at twice the driving frequency fx flow through the first winding 41 and the second winding 42 respectively.

In the alternating-current power supply device 1 of this configuration example, preferable as the coupling reactor 40 incorporated in it is one that is less likely to be magnetically saturated even when the output has a high crest-factor and that has a leakage inductance sufficient for operation continuously over a wide driving range. Below, there will be proposed novel coupling reactors 40 (in particular, cores 43 with novel configurations) that meet such requirements.

Coupling Reactor (First Embodiment)

Figure 3:
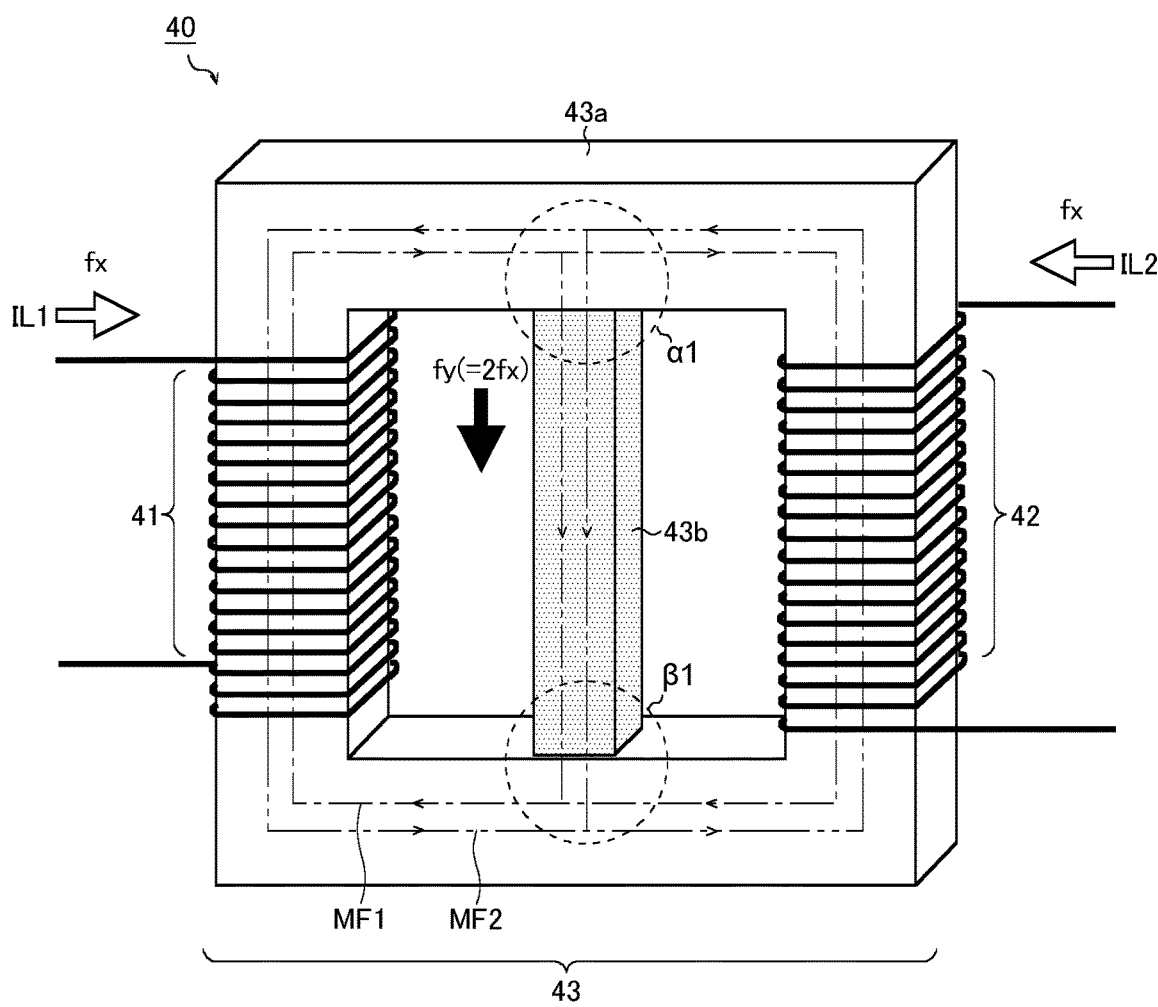
FIG. 3 is a schematic diagram showing a coupling reactor according to a first embodiment.

FIG. 3 is a schematic diagram showing a coupling reactor 40 according to a first embodiment. The coupling reactor 40 according to this embodiment includes, as mentioned above, a first winding 41, a second winding 42, and a core 43. In particular, the core 43 is composed of a first core 43a and a second core 43b in combination, the second core 43b being a member separate from the first core 43a.

The first core 43a is an annular member around which the first winding 41 and the second winding 42 are wound separately, and functions as a magnetic leg. Here, the first winding 41 and the second winding 42 are wound around the first core 43a in such directions that magnetic fluxes MF1 and MF2 they generate inside the first core 43a cancel each other.

When such a configuration is adopted, inside the first core 43a, only a magnetic flux ΔMF (MF1-MF2) is generated due to the difference between the inductor current IL1 flowing through the first winding 41 and the inductor current IL2 flowing through the second winding 42; thus, magnetic saturation is less likely to occur.

On the other hand, the second core 43b is, for example, a bar-like member around which neither a first winding 41 nor a second winding 42 is wound, and functions as what is called a path-core. The second core 43b is arranged such that the magnetic fluxes MF1 and MF2 passing through the second core 43b generate a leakage inductance in the coupling reactor 40. For example, as shown in the diagram, the second core 43b can be arranged so as to couple together coupled parts α1 and β1 of the first core 43a.

The coupled part α1 is a part at which the magnetic fluxes MF1 and MF2 diverge from the first core 43a to the second core 43b, and corresponds, in the illustrated example, to the bottom face of an upper beam part of the first core 43a. On the other hand, the coupled part β1 is a part at which the magnetic fluxes MF1 and MF2 converge from the second core 43b to the first core 43a, and corresponds, in the illustrated example, to the top face of a lower beam part of the first core 43a.

Figure 4:
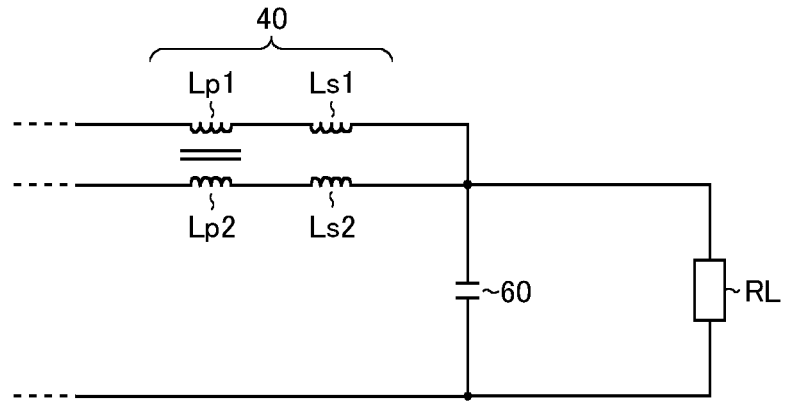
FIG. 4 is an equivalent circuit diagram of a coupling reactor.

FIG. 4 is an equivalent circuit diagram of the coupling reactor 40. As shown there, in the coupling reactor 40, there are generated, other than excitation inductances Lp1 and Lp2 which are magnetically coupled together, leakage inductances Ls1 and Ls2 resulting from the magnetic fluxes diverging from the first core 43a to the second core 43b.

These leakage inductances Ls1 and Ls2, along with the output capacitor 60, can be used as a smoothing reactor for forming an LC filter. Thus, when the first core 43a and the second core 43b are separate members, by appropriately designing the physical properties of the first core 43a and the physical properties and shape of the second core 43b, it is possible to adjust as necessary the characteristics of the smoothing reactor. As a result, it is possible to achieve a compact coupling reactor 40 that has desired leakage inductances Ls1 and Ls2, and thus to contribute to reducing the size of the entire alternating-current power supply device 1.

Thus, one feature of the coupling reactor 40 according to this embodiment is that the first core 43a and the second core 43b are provided as separate members. Here, it is not always necessary that the first core 43a and the second core 43b be formed of different materials. For example, even when the first core 43a and the second core 43b are both formed of the same material, as long as they are separate members, as compared with a case where they are molded integrally, it is easy to change the shape and cross-sectional area of the second core 43b (the cross-sectional area of the second core 43b perpendicular to the direction of the magnetic flux penetrating the second core 43b); it is thus possible to adjust as necessary the characteristics of the smoothing reactor.

Producing a leakage inductance similar to the one described above by use of the conventional core (what is called an E-shaped core) having a magnetic leg and a path-core formed integrally requires a large gap to be provided in the path-core; this inconveniently increases the magnetic flux discharged into the air.

On the other hand, with the coupling reactor 40 according to this embodiment, it is not always necessary to provide a gap in the second core 43b; this helps significantly reduce the magnetic flux discharged into the air. Thus, it is also possible to prevent the malfunction of control circuit components provided around the coupling reactor 40 and to reduce the eddy current loss in a circuit pattern, and it is thus possible to achieve an alternating-current power supply device 1 less prone to malfunction and power loss.

The first core 43a can be designed separately, with no consideration given to the above-described generation of a leakage inductance. This helps improve the flexibility in the design, and thus, for example, it is possible to achieve cost reduction in material selection.

With reference back to FIG. 3, the coupling reactor 40 will be described further. In the coupling reactor 40 of this embodiment, the second core 43b serving to generate a leakage inductance is arranged such that, when the PWM control bridges 20 and 30 are driven with a phase difference of a half cycle from each other, the variation frequency fy of the magnetic flux that passes through the second core 43b is higher (for example, 40 kHz (2×fx)) than the driving frequency fx (for example, 20 kHz) of the PWM control bridges 20 and 30.

With such a configuration, the inductance values of the leakage inductances Ls1 and Ls2 required for forming an LC filter can be reduced. Specifically, as compared with a case where a single PWM control bridge and a reactor are used, it is possible to reduce the inductance values that are required for producing the same output current to about a quarter owing to a reduction in the necessary leakage inductance resulting from current oscillation at twice the driving frequency fx and a reduction in the necessary leakage inductance resulting from a reduction in the voltages applied to the respective leakage inductance parts (values obtained by subtracting the voltages applied to the reactor coupled parts from the difference between the input and output voltages). Thus, it is possible to achieve compactness and cost reduction by reducing the cross-sectional area of the second core 43b, and to achieve size reduction in the input capacitor 50 and the output capacitor 60. Conversely, assuming that the core cross-sectional area is the same as in the case where a single PWM control bridge is used, it is possible to permit about four times as high an electric current. It can be said that the alternating-current power supply device 1 with a high crest-factor is notably effective in the above-mentioned size reduction.

In the coupling reactor 40 according to this embodiment, the total magnetic flux obtained by adding up the magnetic flux MF1 from the first winding 41 and the magnetic flux MF2 from the second winding 42 penetrates the second core 43b. That is, in the second core 43b, a magnetic flux having a higher density than in the first core 43a results. In view of this, the density of the saturated magnetic flux in the second core 43b is preferably equal to or higher than the density of the saturated magnetic flux in the first core 43a. With such a core design, it is possible to use a second core 43b having an even smaller cross-sectional area, and thus to achieve size reduction in the coupling reactor 40 (hence size reduction in the alternating-current power supply device 1).

Here, if the amount of the magnetic flux leaking from the first core 43a to the second core 43b is too large, the excitation inductances Lp1 and Lp2 are so low that it is meaningless to provide the coupling reactor 40. Thus, when the relative permeability of the second core 43b is high, it is sensible to provide a necessary minimum gap in the second core 43b (within a permissible range where a magnetic flux is discharged into the air) and adjust the balance between the saturated magnetic flux density and the relative permeability.

In the coupling reactor 40 according to this embodiment, the first core 43a is preferably made of a material having isotropic insulation resistance (such as ferrite or pressed-powder metal). With such a material, an eddy current generated in the first core 43a does not have dependence on the direction of the magnetic flux. Thus, in the coupled part α1 at which the magnetic fluxes MF1 and MF2 diverge from the first core 43a to the second core 43b and the coupled part β1 at which the magnetic fluxes MF1 and MF2 converge from the second core 43b to the first core 43a, even though the directions of the magnetic fluxes MF1 and MF2 change, the magnitude of the eddy current does not vary; it is thus possible to prevent reaching the Curie temperature and an increase in the loss due to local heating.

As described above, with the coupling reactor 40 according to this embodiment, it is possible to achieve a compact smoothing reactor that suppresses magnetic saturation when the output has a high crest-factor and that has leakage inductances Ls1 and Ls2 sufficient for operation continuously over a wide driving range. Thus, it is possible to provide a compact high-efficiency alternating-current power supply device less prone to malfunction.

Core Material with Anisotropic Insulation Resistance

In the first embodiment, as mentioned in the course of its description, for structural reasons, it is preferable that the first core 43a be formed of a material having isotropic insulation resistance. However, as the material forming the first core 43a, also a material having anisotropic insulation resistance is often used.

Figure 5:
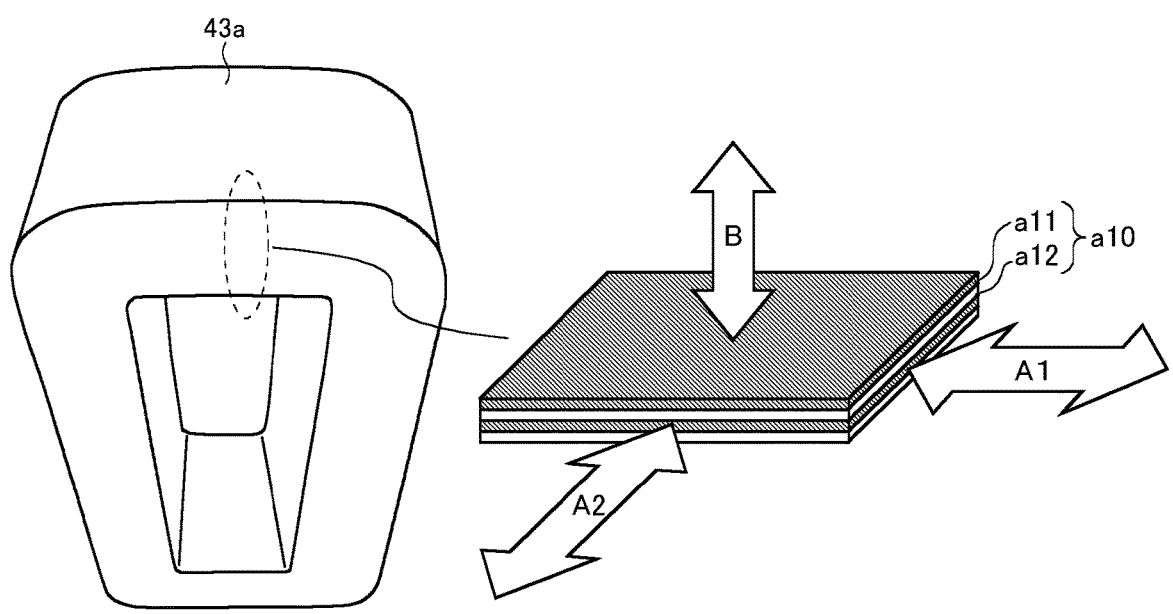
FIG. 5 is a schematic diagram showing an example of a core material having anisotropic insulation resistance.

FIG. 5 is a schematic diagram showing one example of a core material having anisotropic insulation resistance. The first core 43a shown in the diagram is formed by winding around a metal die a number of times a thin-belt member a10 having a magnetic member a11 (for example, amorphous alloy) and an insulating member a12 laid on top of another. Thus, the first core 43a as seen in a sectional view or a side view has the magnetic member a11 and the insulating member a12 laid on top of another in many layers in the up-down direction.

When the first core 43a is seen from the A1 direction or the A2 direction (the direction normal to a sectional plane or a side face), the cross-sectional area of the magnetic member a11 is small, and thus the insulation resistance is high. On the other hand, when the first core 43a is seen from the B direction (the direction normal to a top face), the cross-sectional area of the magnetic member a11 is large, and thus the insulation resistance is low. Thus, the thin-belt member a10 is a material having anisotropic insulation resistance (a material having different insulation resistances, one in the A1 and A2 directions and the other in the B direction). Thus, in the first core 43a formed with such a material, the eddy current generated there has dependence on the direction of the magnetic flux.

In the first embodiment, in the coupled parts α1 and β1 in FIG. 3, a magnetic flux is generated in the B direction in which the insulation resistance is low, and thus the eddy current is high; this may inconveniently cause local heating.

To cope with that, below, there will be proposed a novel coupling reactor 40 (in particular, a core 43 with a novel configuration) that can, even when a material having anisotropic insulation resistance is used as the material forming the first core 43a, provide effects similar to those obtained with the first embodiment while minimizing the problem of local heating.

Coupling Reactor (Second Embodiment)

Figure 6:
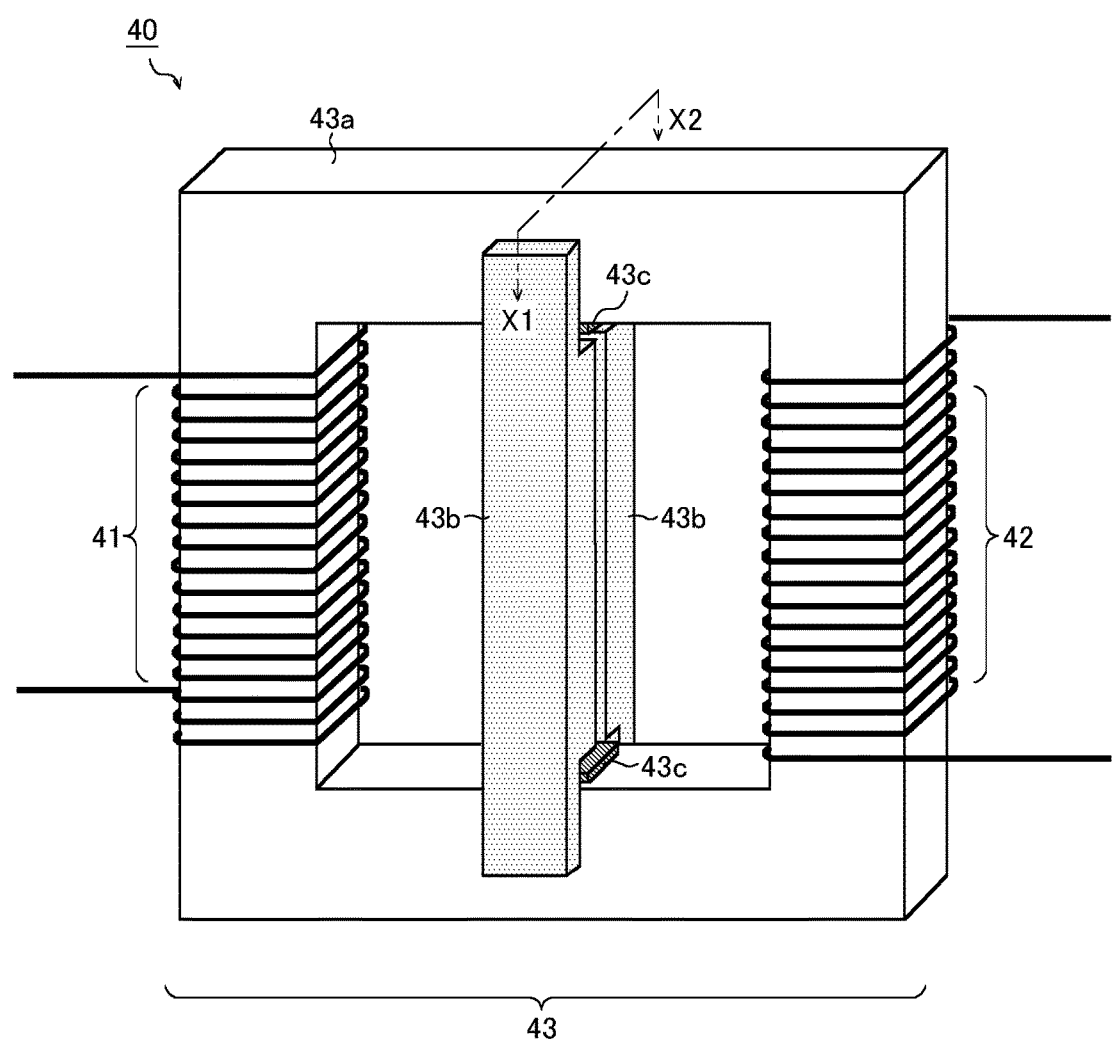
FIG. 6 is a schematic diagram showing a coupling reactor according to a second embodiment.
Figure 7:
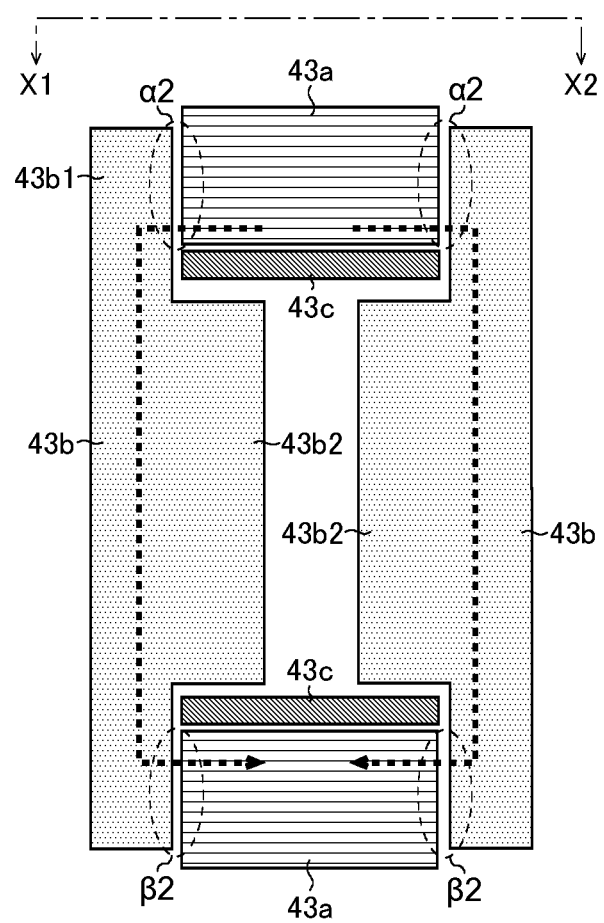
FIG. 7 is a sectional view across line X1-X2.

FIG. 6 is a schematic diagram showing a coupling reactor 40 according to a second embodiment. FIG. 7 is a sectional view of the coupling reactor 40 across line X1-X2. The coupling reactor 40 according to this embodiment, while being based on the first embodiment, is characterized in that the first core 43a is formed with a material having anisotropic insulation resistance, that the shape and arrangement of the second core 43b are altered, and that a magnetic shielding member 43c is additionally provided. Thus, such constituent elements as find their counterparts in the first embodiment are identified by the same reference signs as in FIG. 3, and no overlapping description will be repeated. The following description focuses on features peculiar to this embodiment.

In the coupling reactor 40 according to this embodiment, the second core 43b has an extension 43b1 and a main body 43b2. The extension 43b1 extends from the main body 43b2 in the up-down direction so as to cover at least parts (corresponding to coupled parts α2 and β2) of respective side surfaces of an upper beam part and a lower beam part of the first core 43a.

The magnetic shielding member 43c is a member for restricting, in the above-mentioned coupled parts α2 or β2, the path of the magnetic flux passing between the first core 43a and the second core 43b to the sideways direction with respect to the first core 43a (corresponding to the A2 direction in FIG. 5). From another perspective, the magnetic shielding member 43c can be said to be a member for permitting the magnetic flux that tends to turn its direction from the A1 direction to the A2 direction and vice versa in FIG. 5 to pass, without shielding it, while shielding the magnetic flux that tends to turn its direction from the A1 direction to the B direction and vice versa. As shown in the diagram, the magnetic shielding member 43c can be provided between the first core 43a and the main body 43b2.

With such a configuration, the magnetic flux diverging from the first core 43a to the second core 43b and the magnetic flux converging from the second core 43b to the first core 43a each turn its direction through a passage where the magnetic resistance does not vary (a passage leading from the A1 direction to the A2 direction or a passage leading from the A2 direction to the A1 direction). Thus, even when a material having anisotropic insulation resistance is used as the material forming the first core 43a, it is possible to suppress the occurrence of the eddy current; this makes it possible to obtain workings and effects similar to those obtained with the first embodiment while minimizing the problem of local heating. Here, as the magnetic shielding member 43c, a copper plate or the like can suitably be used.

The main body 43b2 is so formed as to have a cross-sectional area (the cross-sectional area perpendicular to the magnetic flux penetrating the second core 43b) larger than that of the extension 43b1. More specifically, the extension 43b1 and the main body 43b2 are formed such that their outer faces are flush with each other, and the main body 43b2 protrudes to inside the first core 43a so as to fill the cavity inside the first core 43a. With such a configuration, it is possible, while minimizing an increase in the size of the coupling reactor 40, to increase the cross-sectional area of the second core 43b, and thus, the second core 43b is less likely to be magnetically saturated.

In this embodiment, a pair of second cores 43b are provided so as to hold the first core 43a between them from opposite sides of the first core 43a. Here, it is not always necessary to provide the pair of second cores 43b; providing at least one second core 43b suffices to achieve the above-mentioned function.

While, in this embodiment, a pair of main bodies 43b2 are arranged opposite each other across a clearance, there is no limitation on the size of the clearance. In the first place, the above-mentioned clearance itself is not an essential constituent element; instead, the thickness of the opposite main bodies 43b2 may be adjusted so that they make contact with each other.

While, in this embodiment, the extension 43b1 is in such a shape as to cover part of the side face of the first core 43a as seen from the up-down direction, instead, the extension 43b1 may be in such a shape as to cover the entire side face of the first core 43a.

Figure 8A:
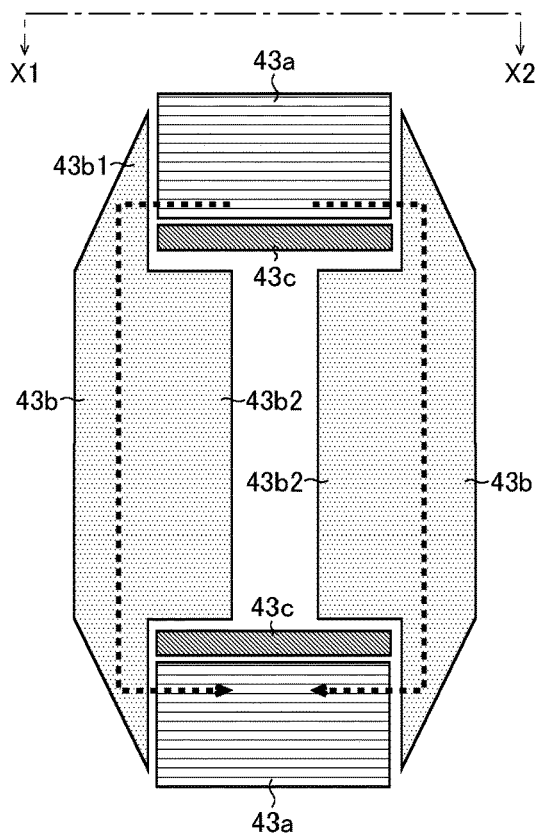
FIG. 8A is a sectional view of a first modified example across line X1-X2.

FIG. 8A is a sectional view of a first modified example of the coupling reactor 40 across line X1-X2. As in this modified example, the extension 43b1 of the second core 43b may be tapered along the path of the magnetic flux. This helps reduce the material cost of the second core 43b.

Figure 8B:
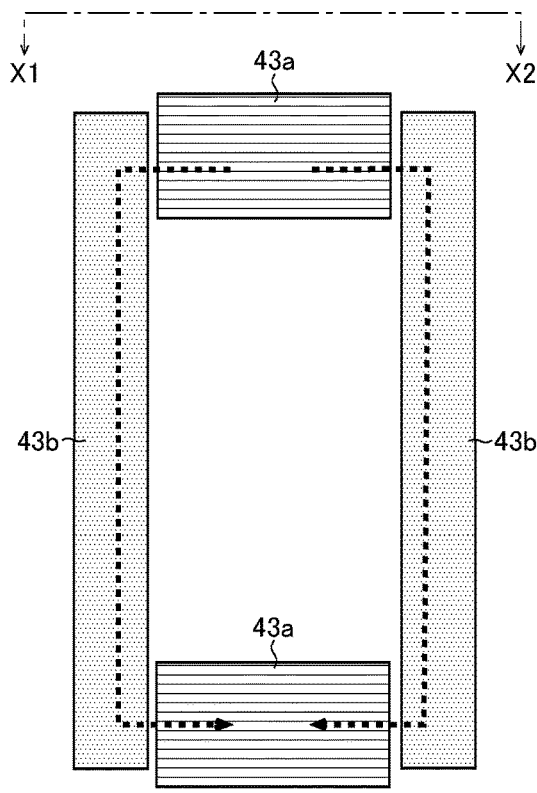
FIG. 8B is a sectional view of a second modified example across line X1-X2.

FIG. 8B is a sectional view of a second modified example of the coupling reactor 40 across line X1-X2. As in this modified example, the second core 43b may be a simple plate-form member with no distinction as between the extension 43b1 and the main body 43b2. When this configuration is adopted, there is no path either for a magnetic flux traveling from the A1 direction to the B direction in FIG. 5 or for a magnetic flux traveling from the B direction to the A1 direction; this makes it possible to exclude the magnetic shielding member 43c.

Figure 8C:
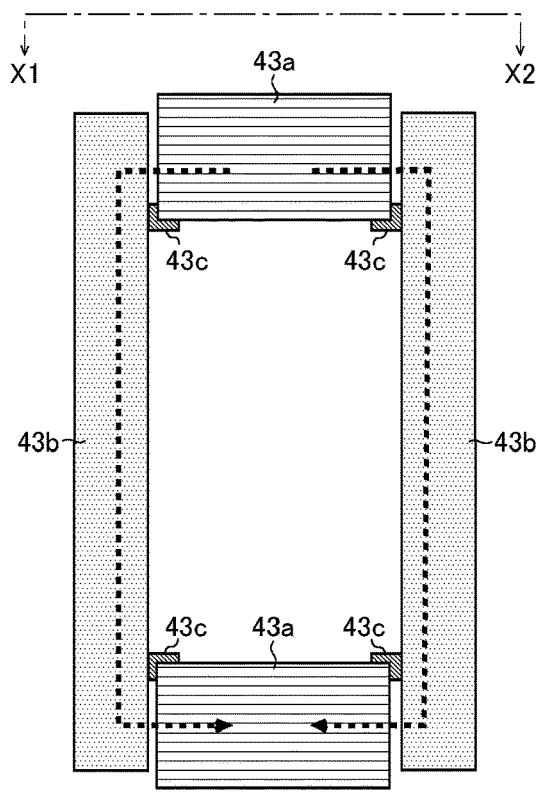
FIG. 8C is a sectional view of a third modified example across line X1-X2.

FIG. 8C is a sectional view of a third modified example of the coupling reactor 40 across line X1-X2. In this modified example, while it is based on the second modified example (FIG. 8B), magnetic shielding members 43c are provided each between a corner of the first core 43a and the second core 43b. With such a configuration, it is possible to suppress local heating by alleviating the concentration of the magnetic flux and restricting the direction of the magnetic flux.

Figure 8D:
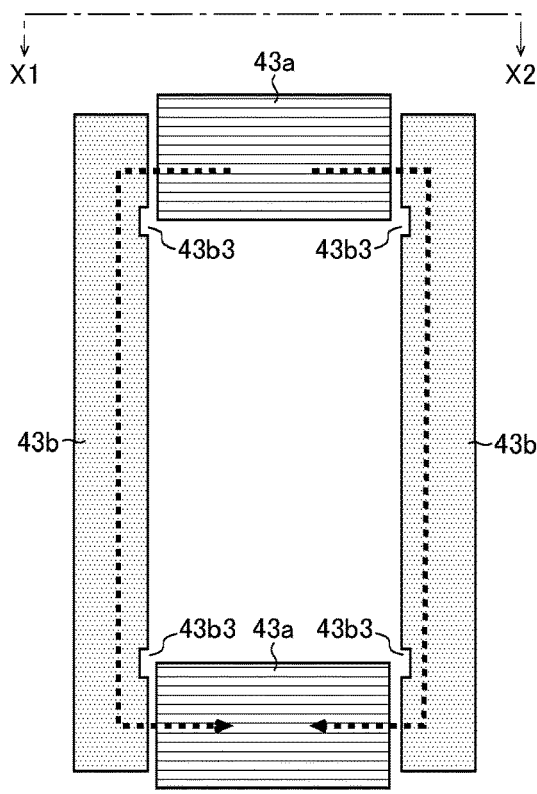
FIG. 8D is a sectional view of a fourth modified example of across line X1-X2.

FIG. 8D is a sectional view of a fourth modified example of the coupling rector 40 across line X1-X2. In this modified example, while also it is based on the second modified example (FIG. 8B), grooves 43b3 are provided in the second core 43b at such places as to avoid contact between corners of the first core 43a and the second core 43b. With such a configuration, as in the third modified example (FIG. 8C), it is possible to suppress local heating by alleviating the concentration of the magnetic flux and restricting the direction of the magnetic flux.

Coupling Reactor (Third Embodiment)

Figure 9:
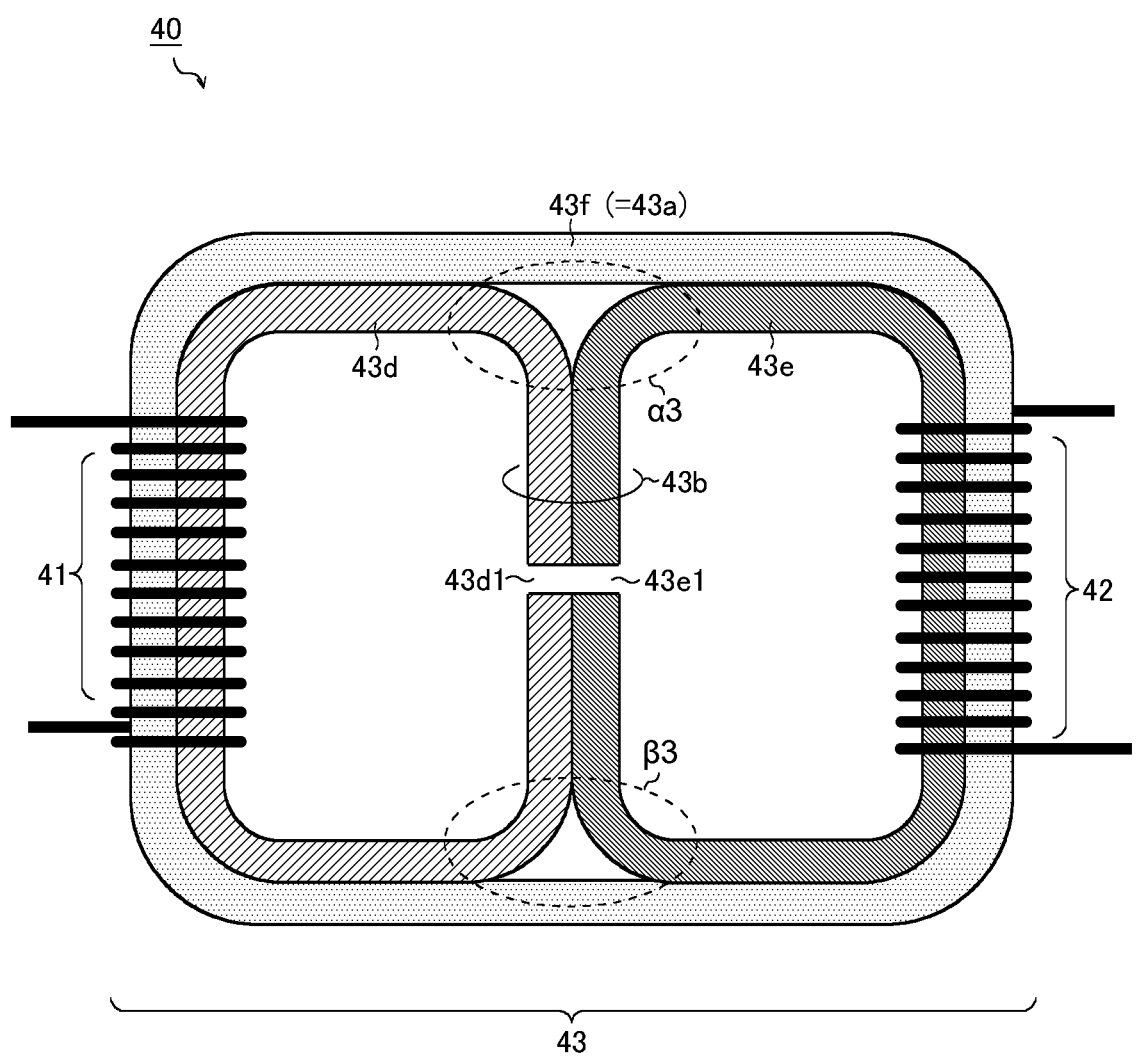
FIG. 9 is a schematic diagram showing a coupling reactor according to a third embodiment.

FIG. 9 is a schematic diagram showing a coupling reactor 40 according to a third embodiment. In the coupling reactor 40 according to this embodiment, the core 43 is composed of a first annular member 43d, a second annular member 43e, and a third annular member 43f in combination. The first annular member 43d, the second annular member 43e, and the third annular member 43f are all made of the same material having anisotropic insulation resistance (see, for example, FIG. 5).

The first annular member 43d and the second annular member 43e are arranged so as to partly make contact with each other. The third annular member 43f is arranged so as to surround the first annular member 43d and the second annular member 43e along their circumferences.

Such a core 43 can be formed through the following procedure. First, the first annular member 43d and the second annular member 43e are each formed separately by winding the thin-belt member a10 in FIG. 5 around a metal die a number of times, and they are arranged next to each other. Then, with these two members as a winding core, the third annular member 43f is formed by winding the thin-belt member a10 further around them.

In the core 43 configured as described above, the third annular member 43f functions as the previously-described first core 43a. The first annular member 43d and the second annular member 43e function as the previously-described second core 43b.

Around the first core 43a, a first winding 41 and a second winding 42 are wound in such directions that the magnetic fluxes they generate inside the first core 43a cancel each other. On the other hand, around the second core 43b, neither a first winding 41 nor a second winding 42 are wound. The second core 43b is arranged such that the magnetic fluxes passing through the second core 43b generate a leakage inductance in the coupling reactor 40. These features are shared with the previously-described first embodiment (FIG. 3) and second embodiment (FIG. 6).

Here, of the first annular member 43d and the second annular member 43e, bent parts corresponding to opposite end parts of the second core 43b can be understood as a coupled part α3 at which the magnetic fluxes diverge from the first core 43a to the second core 43b and a coupled part β3 at which the magnetic fluxes converge from the second core 43b to the first core 43a.

In the above-mentioned coupled parts α3 and β3, the magnetic flux diverging from the first core 43a to the second core 43b and the magnetic flux converging from the second core 43b to the first core 43a each turn its direction only along the bent direction of the first annular member 43d and the second annular member 43e, and thus no change occurs in the insulation resistance in the penetrating direction of the magnetic flux (in the cross-sectional area of the magnetic member).

In FIG. 5, the magnetic flux penetrating the first core 43a and the second core 43b travels only along the A1 direction where the insulation resistance is high; in the coupled parts α3 and β3, the A1 direction itself changes along the bent direction of the first annular member 43d and the second annular member 43e. Thus, even when the diverging and converging of the magnetic fluxes occur, no magnetic flux is generated in the B direction in which the insulation resistance is low.

Thus, in the coupling reactor 40 according to this embodiment, the first core 43a and the second core 43b are formed such that the insulation resistance does not vary along the direction of the magnetic flux passing through the first core 43a and the second core 43b (that is, the insulation resistance is kept at a high value). Thus, even when a material having anisotropic insulation resistance is used as the material forming the first annular member 43d, the second annular member 43e, and the third annular member 43f (hence, the material forming the first core 43a and the second core 43b), it is possible to suppress the occurrence of the eddy current; this makes it possible to obtain workings and effects similar to those obtained with the first embodiment and the second embodiment while minimizing the problem of local heating.

If it is necessary to adjust the leakage inductance, in both of the first annular member 43d and the second annular member 43e, the number of layers can be reduced, or an appropriate gap can be provided in the second core 43b by forming gaps 43d1 and 43e1 at positions facing each other.

Driving Frequency Control

In the alternating-current power supply device 1 which has been described, the driving frequency fx of the PWM control bridges 20 and 30 is preferably made to vary according to alternating-current variation (periodical variation) in the output current or peak variation (load variation) in the output current. For example, the driving frequency fx can be made to vary stepwise according to the output current such that the driving frequency fx becomes low when a high current is output, and the driving frequency fx becomes high when a low current is output. Performing such driving frequency control makes it possible to keep a continuous mode with high-efficiency over a wide driving range, and thus to handle loads universally.

Here, the continuous mode does not need to be established completely in the entire driving range (entire load region) of the alternating-current power supply device 1. For example, in a light-load region, by performing switching operation in a critical mode (an operation mode where the output current instantaneously becomes zero), it is possible to reduce switching loss during turn-ON.

With a design where, under the same conditions, the core loss of the second core 43b is smaller than the core loss of the first core 43a, even if the driving frequency fx is high when the load is heavy, it is possible to prevent the efficiency from lowering due to an increased core loss, and thus to achieve an alternating-current power supply device 1 with high efficiency.

The second core 43b is preferably formed with a material (such as a metal glass core) of which the permeability varies little within the variable range of the driving frequency fx.

Application of SiC and GaN

At least one of the switching devices 21 and 22 forming the PWM control bridge 20, and at least one of the switching devices 31 and 32 forming the PWM control bridge 30, preferably comprise a SiC semiconductor or a GaN semiconductor.

Thus, with a switching device comprising a SiC semiconductor or a GaN semiconductor, as compared with a switching device comprising a Si semiconductor, it is possible to reduce the parasitic capacitance, and thus to suppress an increase in the switching loss when the driving frequency is high.

In the coupling reactor 40, by adopting the above-described embodiments, even when the current is high (the electric power is high) and magnetic saturation is more likely to occur with a common choke coil used, it is possible to make the coupling reactor 40 compact. Thus, it is possible to achieve a compact high-efficiency alternating-current power supply device 1 with a large electric power.

By using a SiC-MISFET as the above-mentioned switching device, it is possible to obtain high thermal conductivity owing to a low ON resistance and a vertical structure. Thus, it is possible to achieve a high-current, high-power alternating-current power supply device 1.

In the SiC-MISFET, the reverse recovery current of the body diode is low and the parasitic capacitance is low, and it is thus possible to reduce the effective (RMS) value of the current; this makes it possible to reduce conduction loss in a switching device and in a pattern, and to reduce copper loss in the coupling reactor 40.

Other Modifications

Thus, various technical features disclosed herein may be implemented in any other manner than in the embodiments described above, and allow for many modifications without departing from the spirit of the present invention.

For example, while the above-described embodiments deal with a configuration as an example where PWM outputs of two phases are coupled together by use of a coupling reactor, it is also possible, for example, to couple together PWM outputs of three or more phases with a plurality of coupling reactors, each configured as described above, connected in parallel.

Thus, it should be understood that the embodiments disclosed herein are in every aspect illustrative and not restrictive, and that the technical scope of the present invention is defined not by the description of embodiments given above but by the scope of the appended claims and encompasses any modification in the sense and scope equivalent to those of the claims.

INDUSTRIAL APPLICABILITY

The alternating-current power supply device disclosed herein finds application in a very wide range of fields such as consumer appliances and industrial devices.

LIST OF REFERENCE SIGNS 1 alternating-current power supply device
10 AC generation bridge
20, 30 PWM control bridge
11, 12, 21, 22, 31, 32 switching device
40 coupling reactor
41 first winding
42 second winding
43 core
43a first core
43b second core
43b1 extension (corresponding to a coupled part)
43b2 main body
43b3 groove
43c magnetic shielding member
43d first annular member
43d1 gap
43e second annular member
43e1 gap
43f third annular member
50 input capacitor
60 output capacitor
E1 DC power source
RL load
Lp1, Lp2 excitation inductance
Ls1, Ls2 leakage inductance (smoothing inductance)
a10 thin-belt member
a11 magnetic member
a12 insulating member

The invention claimed is:

1. An alternating-current power supply device comprising:
  an AC generation bridge including a first switching device and a second switching device, a connection node between the first and second switching devices serving as an output terminal and being connected to a first terminal of a load to produce an AC output;
  a first PWM control bridge including a third switching device and a fourth switching device, a connection node between the third and fourth switching devices serving as an output terminal;
  a second PWM control bridge including a fifth switching device and a sixth switching device, a connection node between the fifth and sixth switching devices serving as an output terminal;
  a coupling reactor having a first input terminal and a second input terminal connected to the respective output terminals of the first and second PWM control bridges; and
  an output capacitor having a first terminal connected to an output terminal of the coupling reactor, and a second terminal connected to the output terminal of the AC generation bridge, wherein
  the coupling reactor includes:
    a core; and
    first and second windings having respective first terminals that are, as the first and second input terminals of the coupling reactor, connected to the respective output terminals of the first and second PWM control bridges and
    having respective second terminals that are, as the output terminals of the coupling reactor, connected to a second terminal of the load and the first terminal of the output capacitor,
    the first and second windings being coupled together via the core, and
    the first and second windings are wound in such directions that magnetic fluxes generated by the first and second windings inside the core cancel each other.

2. The alternating-current power supply device of claim 1, wherein
  in the first and second PWM control bridges, the third to sixth switching devices are turned ON and OFF with a phase difference of a half cycle from each other.

3. The alternating-current power supply device of claim 1, wherein
  the core is composed of at least a first core and a second core in combination, the first core being a member separate from the second core,
  the first and second windings are wound around the first core in such directions that magnetic fluxes which the first and second windings generate inside the first core cancel each other, and neither of the first winding nor the second winding is wound around the second core, and
  the second core is arranged such that the magnetic fluxes passing through the second core generate a leakage inductance in the coupling reactor.

4. The alternating-current power supply device of claim 3, wherein
  a variation frequency of a magnetic flux generated in the second core is higher than a driving frequency of the third to sixth switching devices.

5. The alternating-current power supply device of claim 3, wherein
  the first core is formed of a material having isotropic insulation resistance.

6. The alternating-current power supply device of claim 3, wherein
  the first core is formed of a material having anisotropic insulation resistance, and
  the second core is arranged to cover at least a part of a side surface of the first core.

7. The alternating-current power supply device of claim 6, wherein
  the core further includes a magnetic shielding member for restricting a path of a magnetic flux passing between the first core and the second core to a sideways direction with respect to the first core.

8. The alternating-current power supply device of claim 6, wherein
  a cross-sectional area of the second core in a part thereof excluding a part thereof coupled with the first core is larger than a cross-sectional area of the part of the second core coupled with the first core.

9. The alternating-current power supply device of claim 3, wherein
  a density of a saturated magnetic flux in the second core is equal to or higher than a density of a saturated magnetic flux in the first core.

10. The alternating-current power supply device of claim 1, wherein a driving frequency of the third to sixth switching devices varies according to an output current.

11. The alternating-current power supply device of claim 1, wherein
at least one of the third to sixth switching devices comprises a SiC semiconductor or a GaN semiconductor.

12. An alternating-current power supply device comprising:
- an AC generation bridge including a first switching device and a second switching device, a connection node between the first and second switching devices being connected to a first terminal of a load to produce an AC output;
- a first PWM control bridge including a third switching device and a fourth switching device, a connection node between the third and fourth switching devices serving as an output terminal;
- a second PWM control bridge including a fifth switching device and a sixth switching device, a connection node between the fifth and sixth switching devices serving as an output terminal;
- a coupling reactor having a first input terminal and a second input terminal connected to the respective output terminals of the first and second PWM control bridges; and
- an output capacitor having a first terminal connected to an output terminal of the coupling reactor, and a second terminal connected to the output terminal of the AC generation bridge, wherein the coupling reactor includes:
  a core; and
  first and second windings having respective first terminals that are, as the first and second input terminals of the coupling reactor, connected to the respective output terminals of the first and second PWM control bridges and
  having respective second terminals that are, as the output terminals of the coupling reactor, connected to a second terminal of the load,
  the first and second windings being coupled together via the core,
the core is composed of at least a first core and a second core in combination,
the first and second cores are both made of a same material having anisotropic insulation resistance, and are formed such that an insulation resistance thereof does not vary along a direction of a magnetic flux passing through the first and second cores,
the first and second windings are wound around the first core in such directions that magnetic fluxes generated by the first and second windings inside the first core cancel each other, and neither of the first winding nor the second winding is wound around the second core, and
the second core is arranged such that the magnetic fluxes passing through the second core generate a leakage inductance in the coupling reactor.

* * * * *